US011542826B2

(12) United States Patent
Wolfer et al.

(10) Patent No.: US 11,542,826 B2
(45) Date of Patent: Jan. 3, 2023

(54) LABYRINTH SEALS

(71) Applicant: General Electric Company, Schenectady, NY (US)

(72) Inventors: Scott Francis Wolfer, Cincinnati, OH (US); Richard Alan Wesling, Cincinnati, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/205,059

(22) Filed: Mar. 18, 2021

(65) Prior Publication Data

US 2022/0298922 A1 Sep. 22, 2022

(51) Int. Cl.
*F01D 11/02* (2006.01)
*F16J 15/447* (2006.01)

(52) U.S. Cl.
CPC ............. *F01D 11/02* (2013.01); *F16J 15/447* (2013.01); *F05D 2220/32* (2013.01); *F05D 2240/55* (2013.01)

(58) Field of Classification Search
CPC ........ F01D 11/00; F01D 11/001; F01D 11/02; F01D 25/04; F16J 15/447; F16J 15/4472; F05D 2220/32; F05D 2240/55; F05D 2260/96
USPC ...................................................... 277/412
See application file for complete search history.

(56) References Cited

U.S. PATENT DOCUMENTS

| | | | |
|---|---|---|---|
| 2,990,202 A | 6/1961 | Dennison | |
| 3,589,475 A * | 6/1971 | Alford | F01D 11/02 188/381 |
| 4,361,213 A * | 11/1982 | Landis, Jr. | F01D 25/04 188/378 |
| 4,693,616 A | 9/1987 | Rohra et al. | |
| 5,052,828 A | 10/1991 | Ciokajlo et al. | |
| 5,218,816 A * | 6/1993 | Plemmons | F01D 11/02 277/419 |
| 6,494,679 B1 * | 12/2002 | Gadre | F01D 5/24 416/145 |
| 7,435,052 B2 | 10/2008 | Spencer et al. | |
| 7,806,410 B2 | 10/2010 | El-Aini et al. | |
| 10,138,757 B2 | 11/2018 | Witlicki et al. | |
| 2019/0003335 A1 | 1/2019 | Evans et al. | |
| 2019/0211708 A1 | 7/2019 | Kempinger et al. | |

\* cited by examiner

*Primary Examiner* — Eldon T Brockman
*Assistant Examiner* — Elton K Wong
(74) *Attorney, Agent, or Firm* — Dority & Manning, P.A.

(57) ABSTRACT

A labyrinth seal including: an annular seal body having an inner wall and an outer wall spaced apart from one another by an annulus; a nested dampener system disposed along the outer wall, the nested dampener system including: a first dampening element; and a second dampening element, wherein opposite axial ends of the nested dampener system are defined by the first dampening element, and wherein the second dampening element is disposed outside of at least a portion of the first dampening element in a radial direction.

20 Claims, 4 Drawing Sheets

LABYRINTH SEALS

FEDERALLY SPONSORED RESEARCH

This invention was made with United States Government support. The Government has certain rights in the invention.

FIELD

The present subject matter relates generally to labyrinth seals, and more particularly to labyrinth seals having nested dampener systems.

BACKGROUND

Many systems, such as gas turbine engines, include rotors disposed within openings of stators. In gas turbine engines, for example, alternating stages of rotating blades and stationary vanes are arranged to harness combustion energy to generate force. Seals may be used between the rotors coupled to the rotating blades and openings within the stationary vanes in order to fluidly isolate two or more cavities of the gas turbine engine from one another, such as two sumps including lubrication. These seals typically experience vibrational loading which can damage the seal and reduce operational longevity.

Accordingly, a seal which can effectively mitigate vibrational loading within the system without compromising on spatial availability and sealing effectiveness would be useful.

BRIEF DESCRIPTION

Aspects and advantages of the invention will be set forth in part in the following description, or may be obvious from the description, or may be learned through practice of the invention.

In one exemplary embodiment of the present disclosure, a labyrinth seal comprising: an annular seal body; a nested dampener system disposed along the annular seal body, the nested dampener system comprising: a first dampening element; and a second dampening element, wherein opposite axial ends of the nested dampener system are defined by the first dampening element, and wherein the second dampening element is disposed outside of at least a portion of the first dampening element in a radial direction.

According to another exemplary embodiment, a gas turbine engine comprising: a stator; a rotor rotatable relative to the stator; a labyrinth seal disposed in an annular gap defined between the stator and the rotor, the labyrinth seal comprising: an annular seal body; a nested dampener system disposed along the annular seal body, the nested dampener system comprising: a first dampening element; and a second dampening element, wherein opposite axial ends of the nested dampener system are defined by the first dampening element, and wherein the second dampening element is disposed outside of the first dampening element in a radial direction.

According to another exemplary embodiment, a system comprising: a stator; a rotor rotatable relative to the stator; a labyrinth seal disposed in an annular gap defined between the stator and the rotor, the labyrinth seal comprising: an annular seal body having an inner wall and an outer wall spaced apart from one another by an annulus; a nested dampener system disposed along the outer wall, the nested dampener system comprising: a first dampening element defining a generally C-shaped body, wherein the first dampening element defines a distal end of the outer wall of the annular seal; and a second dampening element disposed at least partially within an inner volume defined by the generally C-shaped body, wherein opposite axial ends of the nested dampener system are defined by the first dampening element, wherein the second dampening element is disposed outside of the first dampening element in a radial direction, and wherein the first and second dampening elements are spaced apart from one another in the radial direction by a gap.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Repeat use of reference characters in the present specification and drawings is intended to represent the same or analogous features or elements of the present invention.

DETAILED DESCRIPTION

Reference now will be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

The word "exemplary" is used herein to mean "serving as an example, instance, or illustration." Any implementation described herein as "exemplary" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The singular forms "a," "an," and "the" include plural references unless the context clearly dictates otherwise. The terms "coupled," "fixed," "attached to," and the like refer to both direct coupling, fixing, or attaching, as well as indirect coupling, fixing, or attaching through one or more intermediate components or features, unless otherwise specified herein.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust. The terms "upstream" and "downstream" refer to the relative direction with respect to fluid flow in a fluid pathway. For example, "upstream" refers to the direction from which the fluid flows, and "downstream" refers to the direction to which the fluid flows.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 10 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

In general, a labyrinth seal in accordance with one or more embodiments described herein can utilize a nested dampener system to reduce vibrational loading in the labyrinth seal without negatively impacting spatial requirements for fluid transport relative to the seal. That is, the nested dampener system can minimally affect, for example, oil and air circulation within the system while effectively reducing damage and increasing seal longevity despite unwanted vibrational frequencies travelling within the system.

Figures 1, 2:
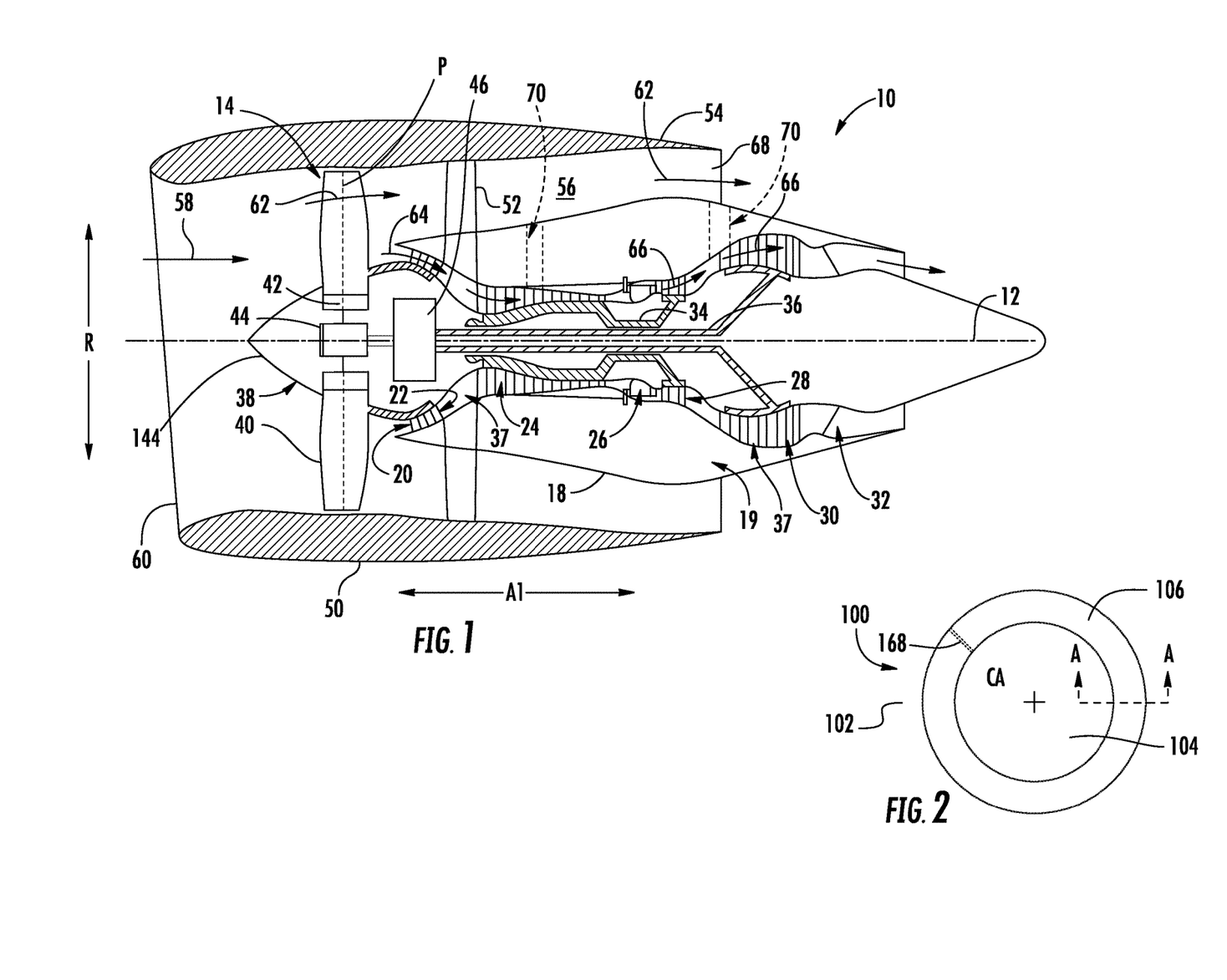
FIG. 1 is a cross-sectional schematic view of a high-bypass turbofan jet engine in accordance with an exemplary embodiment of the present disclosure.
FIG. 2 is a simplified axial view of an exemplary system including a stator, a rotor, and a seal disposed therebetween in accordance with an exemplary embodiment of the present disclosure.

Referring now to the drawings, FIG. 1 illustrates a high-bypass turbofan jet engine, referred to herein as a "gas turbine engine," in accordance with an embodiment. As shown in FIG. 1, the turbofan engine 10 defines an axial direction A (extending parallel to a longitudinal centerline 12 provided for reference) and a radial direction R. In general, the turbofan engine 10 includes a fan section 14 and a turbomachine 16 disposed downstream from the fan section 14.

The exemplary turbomachine 16 depicted generally includes an outer casing 18 that defines an annular inlet 20. Within the outer casing 18 may be considered an interior 19 of the turbomachine 16, and more specifically, of the turbofan engine 10. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. The compressor section, combustion section 26, turbine section, and exhaust nozzle section 32 together define at least in part a core air flowpath 37 through the turbomachine 16. A high pressure (HP) shaft or spool 34 (or rather a high-pressure spool assembly, as described below) drivingly connects the HP turbine 28 to the HP compressor 24. A low pressure (LP) shaft or spool 36 drivingly connects the LP turbine 30 to the LP compressor 22.

For the embodiment depicted, the fan section 14 includes a variable pitch fan 38 having a plurality of fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40 in unison. The fan blades 40, disk 42, and actuation member 44 are together rotatable about the longitudinal centerline 12 by LP shaft 36 across a power gear box 46. The power gear box 46 includes a plurality of gears for stepping down the rotational speed of the LP shaft 36 to a more efficient rotational fan speed.

Referring still to the exemplary embodiment of FIG. 1, the disk 42 is covered by rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the turbomachine 16. The nacelle 50 is supported relative to the turbomachine 16 by a plurality of circumferentially spaced outlet guide vanes 52. Moreover, the nacelle 50 extends over an outer portion of the turbomachine 16 so as to define a bypass airflow passage 56 therebetween.

During operation of the turbofan engine 10, a volume of air 58 enters the turbofan engine 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66. Subsequently, the combustion gases 66 are routed through the HP turbine 28 and the LP turbine 30, where a portion of thermal and/or kinetic energy from the combustion gases 66 is extracted.

The combustion gases 66 are then routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 68 of the turbofan engine 10, also providing propulsive thrust.

It will be appreciated that within the turbofan engine 10, there are a variety of seals, including labyrinth seals, that may provide at least in part fluid isolation between adjacent cavities, such as adjacent cavities of differing pressures. These seals may allow for fluid isolation of a buffer cavity surrounding a bearing sump, of a cooling airflow path, etc. For example, the seals may be provided to define at least in part a buffer cavity around bearing sump housing a bearing supporting the LP spool 36 or HP spool 34 within the turbine section of the turbofan engine 10. Additionally, or alternatively, a labyrinth seal may be provided at an inner end along a radial direction of a stage of stator vanes between the stage of stator vanes and a connector between two adjacent stages of rotor blades. As will be appreciated, in any of these configurations, the labyrinth seal may generally be configured to provide the above sealing between a rotating component and a stationary component.

It will be appreciated, however, that the exemplary turbofan engine 10 depicted in FIG. 1 is provided by way of example only. In other exemplary embodiments the present disclosure, the turbofan engine 10 may have any other suitable configuration, such as any other suitable number of compressors or turbines, or any geared or direct drive system, variable pitch or fixed pitch fan, etc. Further, although depicted as a turbofan engine in FIG. 1, in other embodiments, any other suitable turbine engine may be provided. For example, in other embodiments, the turbine engine may be a turbojet engine, a turboprop engine, etc. Further, in still other exemplary embodiments of the present disclosure, the turbine engine may not be an aeronautical gas turbine engine, such as the engine depicted in FIG. 1, and instead may be, e.g., a land-based turbine engine used, e.g., for power generation, or a nautical turbine engine. Further, still, in other embodiments, any other suitable type of engine may be provided, such as a rotary engine, such as an internal combustion engine.

FIG. 2 is an axial view of an exemplary system 100 in accordance with an embodiment. The system 100 may be part of a rotating assembly of the aforementioned turbofan engine 10. For example, the system 100 may be part of the spools 34 and 36. The system 100 generally includes an outer element, e.g., a stator 102, and an inner element, e.g., a rotor 104, disposed within an annular opening 106 of the stator 102. The system 100 may include a gas turbine engine like that described with respect to FIG. 1. Alternatively, the system 100 can include another system for use in a different application. A seal 108, referred to as a labyrinth seal, can be disposed within the opening 106 between the stator 102 and the rotor 104.

The rotor 104 can be configured to rotate within and relative to the stator 102. First and second compartments 110 and 112 of the system 100 may be fluidly isolated from one another by way of the seal 108. In certain instances, the seal 108 can form an interference fit with stator 102 and rotor 104 in the radial direction R. The opening 106 can include one or more keying features configured to maintain the seal 108 within the opening 106 and prevent the seal 108 from moving undesirably in the axial direction A.

The seal 108 can include a labyrinth seal, sometimes referred to as an isolator type seal. The seal 108 can be affixed to either the stator 102 or the rotor 104. As the stator 102 and rotor 104 move relative to one another, e.g., as the stator 102 and rotor 104 rotate relative to one another, the seal 108 can remain fixed relative to one of the stator 102 and rotor 104. In a particular embodiment, the rotor 104 can be rotatably driven relative to the stator 102. During rotation, the rotor 104 can agitate contaminants and fluids within one or both of the first and second compartments 110 and 112. The seal 108 can prevent the contaminants and/or fluid from passing to the other of the first and second compartments 110 and 112.

Figure 3:
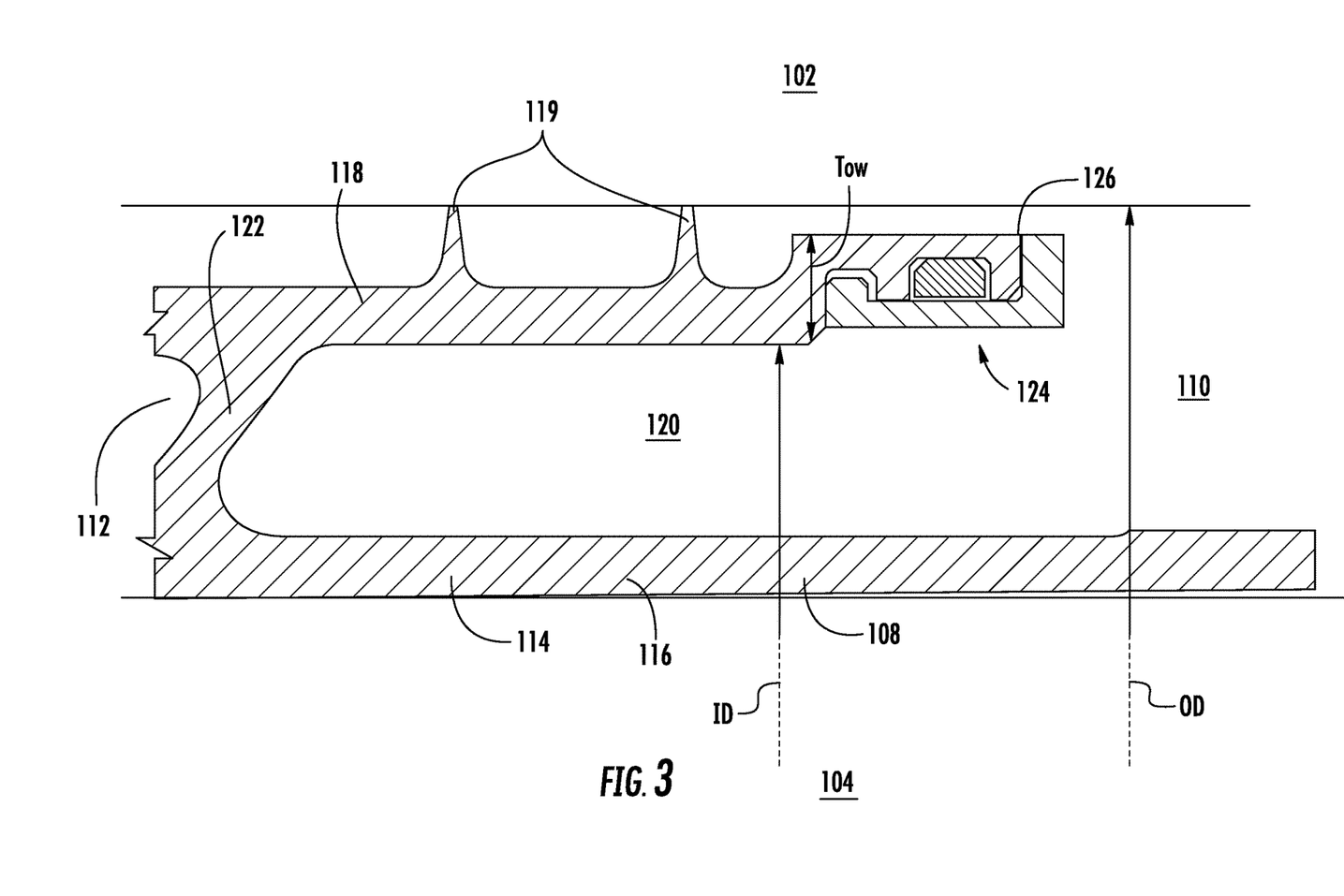
FIG. 3 is a cross-sectional, schematic view of an exemplary seal of the system, as seen along Line B-B in FIG. 2 in accordance with an exemplary embodiment of the present disclosure.

FIG. 3 illustrates an exemplary cross-sectional view of the seal 108 as seen along Line B-B in FIG. 2. The seal 108 includes a seal body 114 defining a circumferentially inner wall 116 and a circumferentially outer wall 118 spaced apart from one another by an annulus 120. The inner and outer walls 116 and 118 can be coupled together through a connecting element, such as a hub 120. The inner and outer walls 116 and 118 can extend from the hub 120 in a generally same axial direction. As shown in the illustrated embodiment, the inner and outer walls 116 and 118 can have different lengths, as measured from the hub 120. For instance, the inner wall 116 can be longer than the outer wall 118. By way of example, the inner wall 116 can define a length that is no less than 101% the length of the outer wall 118, such as no less than 102% the length of the outer wall 118, such as no less than 103% the length of the outer wall 118, such as no less than 104% the length of the outer wall 118, such as no less than 105% the length of the outer wall 118, such as no less than 110% the length of the outer wall 118, such as no less than 115% the length of the outer wall 118, such as no less than 120% the length of the outer wall 118, such as no less than 125% the length of the outer wall 118, such as no less than 130% the length of the outer wall 118, such as no less than 135% the length of the outer wall 118. In other embodiments, the outer wall 118 may be the same length as the inner wall 116. Moreover, in yet other embodiments, the outer wall 118 may be longer than the inner wall 116. The relative geometries of the inner and outer walls 116 and 118 may be selected based on application type or the environment in which the seal 108 is to be used in.

In an embodiment, the outer wall 118 can include one or more projections 119, or other similar features, e.g., scrapers and the like, which extend radially and interface with the stator 102. The one or more projections 119 can form a fluidic barrier to mitigate fluid passage between the first and second compartments 110 and 112.

The annulus 120 defined between the inner and outer walls 116 and 118 can be configured to contain fluid therein. For instance, the fluid can include oil, air, and other fluids associated with the operating conditions of the opening 106 in which the seal 108 is disposed within. In certain embodiments, the annulus 120 can be in fluid communication with another section of the system 100 through one or more openings (not illustrated) extending through the seal body 114.

In a non-illustrated embodiment, the seal body 114 can include a single-wall construction. That is, for example, the seal body 114 can include only one of the inner wall 116 and outer wall 118. Moreover, the single-wall seal body 114 can have the single-wall extending at any location in the radial and axial directions.

The seal body 114 can include an annular structure configured to be disposed in the opening 106. The seal body 114 may be formed from a generally resilient material configured to provide a fluidic barrier when operating under variable conditions, e.g., when the first and second compartments 110 and 112 (FIG. 3) are operating at different fluidic pressures. Exemplary materials for the seal body 114 include engine alloys such as Inconel 188, Inconel 230, Inconel 600, Inconel 601, Inconel 718, steel alloys (e.g., 15-5PH, 17-4PH, A-286, AISI 4340, etc.), nickel alloys (IN718, etc.), titanium alloys (Ti 6-4, etc.), or another suitable engine alloy or combination thereof. In a particular embodiment, the seal body 114 may include Inconel 718. The seal body 114 can additionally include one or more filler materials. Exemplary fillers include glass fibers, carbon fibers, silicon, PEEK, aromatic polyester, carbon particles, bronze, fluoropolymers, thermoplastic fillers, aluminum oxide, polyamidimide (PAI), PPS, polyphenylene sulfone (PPSO$_2$), liquid crystal polymers (LCP), aromatic polyesters, molybdenum disulfide, tungsten disulfide, graphite, grapheme, expanded graphite, boron nitrade, talc, calcium fluoride, or any combination thereof. Additionally, the filler can include alumina, silica, titanium dioxide, calcium fluoride, boron nitride, mica, Wollastonite, silicon carbide, silicon nitride, zirconia, carbon black, pigments, or any combination thereof.

Figure 4:
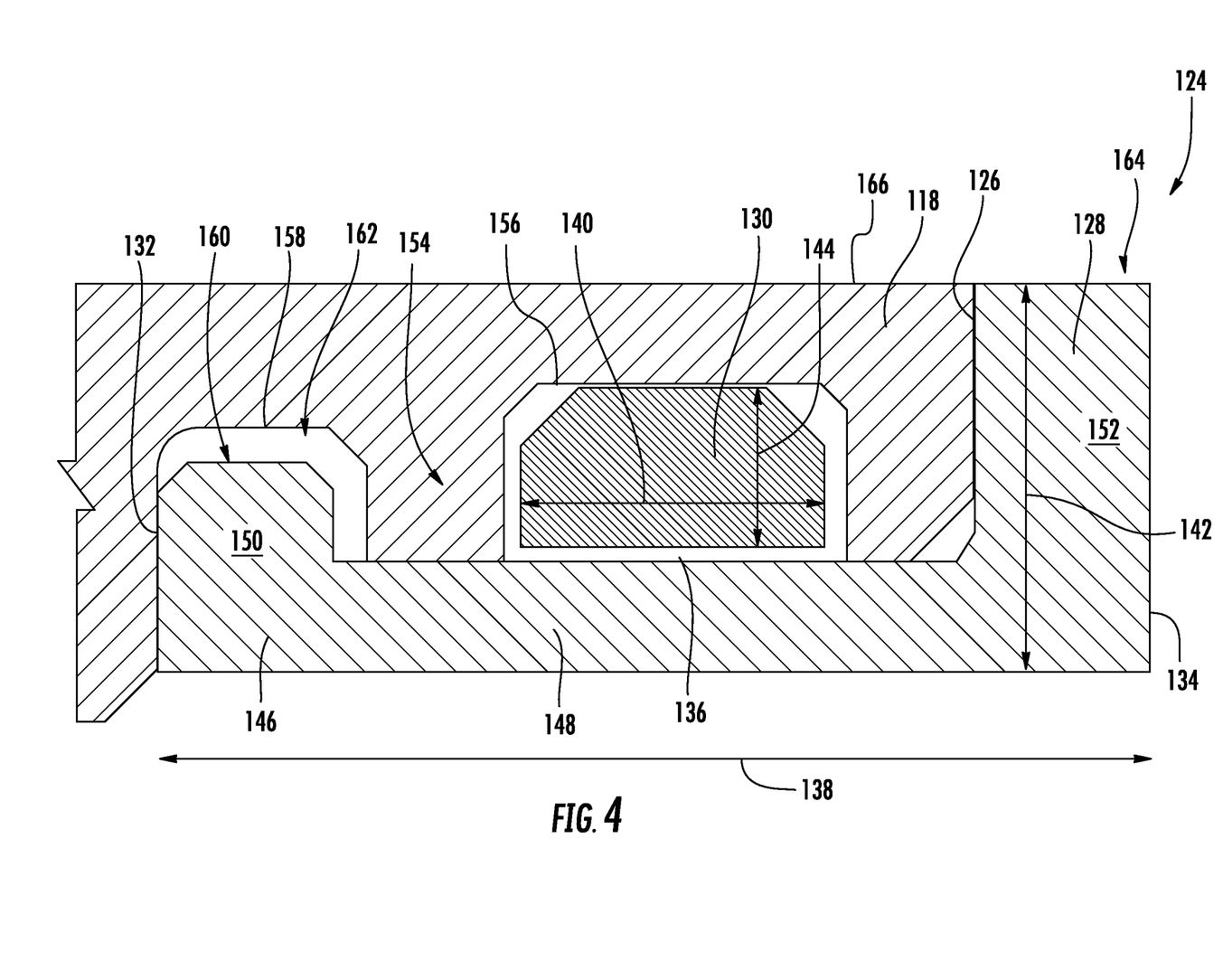
FIG. 4 is a cross-sectional, enlarged view of a portion of the seal including a nested dampener system in accordance with an exemplary embodiment of the present disclosure.

During normal operation, the seal 108 can be exposed to one or more vibrational frequencies which can cause the seal 108 to contort and distort within the opening 106 (FIG. 2). The vibrational frequencies can be generated, for example, by air, rubbing relative to one or both of the stator 102 and/or rotor 104, the natural frequency of the seal 108, or any combination thereof. The frequencies can include propagating wave structures defining local nodes of minimal displacement spaced apart from high-displacement zones. This vibration can occur in a direction into and out of the page as illustrated in FIG. 4. That is, the vibrational frequencies can cause the seal 108 to exhibit rotational, or micro-rotational, movement within the opening 106. Typically, these vibrational frequencies can create standing waves, e.g., flower petals, in the circumferential direction. Left unchecked, these vibrational frequencies and resulting oscillation and movement of the seal body 114 can accelerate wear of the seal 108, thereby reducing operational lifespan.

To compensate, the seal 108 can generally include a nested dampener system 124 configured to mitigate vibrational frequencies within the seal body 114, thereby increasing effective operational lifespan of the seal 108. The nested dampener system 124 can generally include a plurality of dampening elements (discussed hereinafter) arranged in a nested configuration. As such, the plurality of dampening elements can reduce vibrational frequency propagation without occupying a large volume within the seal 108. In certain instances, the nested dampener system 124 can target specific vibrational modes that might otherwise be destructive to the seal 108. For example, at one frequency the neutral axis of the vibration might be at a different radius than another frequency. This might necessitate multiple dampers to be effective for all critical modes. Use of the nested dampener system 124 can permit dampening of all, or at least a majority of, critical modes in a minimal operational space.

Referring still to FIG. 3, the outer wall 118 of the seal 108 can generally define an outer surface 126 defining an outer diameter, OD, of the seal 108, as measured from a central axis CA of the seal 108 (FIG. 2) and an inner diameter, ID, adjacent to the annulus 120, as measured from the central axis CA. The nested dampener system 124 can be disposed within a space of the seal 108 between the ID and OD. In an embodiment, the entire nested dampener system 124 can be disposed outside of the ID of the outer wall 118. In such a manner, the nested dampener system 124 may not affect fluid exchange and movement within the annulus 120. In a more particular embodiment, the nested dampener system 124 can be disposed along, e.g., adjacent to, the outer wall 118 and contained entirely between the ID and OD of the outer wall 118. In yet a more particular embodiment, the nested dampener system 124 can be radially spaced apart from both the ID and OD of the outer wall 118. This spacing may permit flexure of the outer wall 118 and nested dampener system 124 in the radial direction. Accordingly, one or more oscillations induced by the vibrational frequencies exhibited on the seal 108 during operation can cause the outer wall 118 to distort, and the nested dampener system 124 can absorb said distortion and dissipate the absorption through frictional interfacing with the outer wall 118. In yet more particular embodiments, the outer wall 118 can define a sidewall thickness, Tow, measured, e.g., at a location adjacent to the nested dampener system 124, and the nested dampener system 124 can be disposed within an area between Tow.

In an embodiment, the nested dampener system 124, or a portion thereof, can be disposed adjacent to a distal end 126 of the outer wall 118. In a particular embodiment, the distal end 126 of the outer wall 118 can be defined, at least in part, by the nested damper system 124, or a portion thereof.

While reference is made herein to the nested dampener system 124 as being part of the outer wall 118 of the seal body 114, it should be understood that the seal geometry can be inverted such that the outer wall 118 is instead the inner wall 116. In this regard, the nested dampener system 124 can effectively be disposed on the inner wall 116. The specific configuration may depend on operating conditions, material selections, surface conditions, and the like. Accordingly, reference made herein to the outer wall 118 and inner wall 116 may optionally be altered to instead describe the other of the outer wall 118 and inner wall 116. Moreover, in certain instances, nested dampener systems 124 may be utilized along both the inner and outer walls 116 and 118 or at two or more locations along either/both of the inner and/or outer walls 116 and 118.

Referring to FIG. 4, an exemplary, enlarged view of the nested dampener system 124 depicts the nested dampener system 124 as including two dampening elements—a first dampening element 128 and a second dampening element 130. In other embodiments, the nested dampener system 124 may include more than two dampening elements, such as at least three dampening elements, at least four dampening elements, at least five dampening elements, and so on. As illustrated, the first and second dampening elements 128 and 130 are stacked in radial alignment. That is, the second dampening element 130 is contained between opposite axial ends 132 and 134 of the first dampening element 128. Moreover, the second dampening element 130 is disposed radially adjacent to the first dampening element 128. A gap 136 can be disposed between the first and second dampening elements 128 and 130. The gap 136 can extend continuously around the entire circumference of the seal 108. That is, the first and second dampening elements 128 and 130 may not contact one another. By way of non-limiting example, the first and second dampening elements 128 and 130 may be spaced apart in the radial direction by at least 0.1 mm, such as at least 0.25 mm, such as at least 0.5 mm, such as at least 0.75 mm, such as at least 1 mm, such as at least 2 mm, such as at least 3 mm, such as at least 4 mm, such as at least 5 mm, such as at least 6 mm, such as at least 7 mm, such as at least 8 mm, such as at least 9 mm, such as at least 10 mm. In certain instances, the gap 136 may be uniform along the entire axial length of the gap 136. That is, the first and second dampening elements 128 and 130 may be spaced apart by a uniform distance, as measured along the axial length of the gap 136. In other instances, the gap 136 may have variable geometry resulting in a variable gap distance between the first and second dampening elements 128 and 130.

In the illustrated embodiment, the first dampening element 128 defines an axial dimension 138 greater than an axial dimension 140 of the second dampening element 130. For example, the axial dimension 138 of the first dampening element 128 can be at least 101% the axial dimension 140 of the second dampening element 128, such as at least 105% the axial dimension 140 of the second dampening element 128, such as at least 110% the axial dimension 140 of the second dampening element 128, such as at least 125% the axial dimension 140 of the second dampening element 128, such as at least 150% the axial dimension 140 of the second dampening element 128, such as at least 175% the axial dimension 140 of the second dampening element 128, such as at least 200% the axial dimension 140 of the second dampening element 128, such as at least 250% the axial dimension 140 of the second dampening element 128, such as at least.

In the illustrated embodiment, the first dampening element 128 defines a maximum radial dimension 142 greater than a maximum radial dimension 144 of the second dampening element 130. For example, the radial dimension 142 of the first dampening element 128 can be at least 101% the radial dimension 144 of the second dampening element 130, such as at least 105% the radial dimension 144 of the second dampening element 130, such as at least 110% the radial dimension 144 of the second dampening element 130, such as at least 115% the radial dimension 144 of the second dampening element 130, such as at least 120% the radial dimension 144 of the second dampening element 130, such as at least 125% the radial dimension 144 of the second dampening element 130, such as at least 130% the radial dimension 144 of the second dampening element 130, such as at least 135% the radial dimension 144 of the second dampening element 130, such as at least 140% the radial dimension 144 of the second dampening element 130, such as at least 145% the radial dimension 144 of the second dampening element 130, such as at least 150% the radial dimension 144 of the second dampening element 130, such as at least 175% the radial dimension 144 of the second dampening element 130, such as at least 200% the radial dimension 144 of the second dampening element 130.

The first dampening element 128 can have a generally C-shaped body 146, a seen in cross section. The C-shaped body 146 can generally include an axially-extending structure 148 terminated at axial ends 132 and 134 in a first flange 150 and a second flange 152. In another embodiment, the first and second flanges 150 and 152 may be spaced apart from axial ends 132 and 134. As illustrated, in accordance with one or more embodiments, the first and second flanges 150 and 152 can define different radial dimensions. In accordance with another embodiment, the first and second flanges 150 and 152 can define the same radial dimensions.

The C-shaped body 146 can define an inner volume 154 in which the second dampening element 130 is disposed at least partially, such as fully, within. The second dampening element 130 can be spaced apart from the first and second flanges 150 and 152. In an embodiment, a distance between the second dampening element 130 and the first flange 150 can be approximately equal to a distance between the second dampening element 130 and the second flange 152. In another embodiment, the second dampening element 130 can be disposed closer to one of the first and second flanges 150 and 152, i.e., the second dampening element 130 can be axially offset from an axial center location of the first dampening element 128.

In an embodiment, the seal body 114 can define one or more features configured to retain the nested dampener assembly 124 at a suitable location relative to the seal 108. For example, the seal body 118 can include a groove 156 in which the second dampening element 130 is at least partially disposed within. The groove 156 can extend around the entire circumference of the seal 108. As illustrated, the entire second dampening element 130 can be disposed within the groove 156. That is, the groove 156 can define a depth, as measured in the radial direction R, that is deeper than the radial dimension 144 of the second dampening element 130.

The seal body 114 may also, or alternatively, define a groove 158 in which a portion of the first dampening element 128 can be disposed within. More particularly, the first flange 150 of the first dampening element 128 can extend at least partially into the groove 158. Similar to the aforementioned groove 156, in an embodiment, the groove 158 can define a depth, as measured in the radial direction, that is greater than a length of the first flange 150. In such a manner, a radially outer edge 160 of the first flange 150 can be spaced apart from the radially outer surface 162 of the groove 158.

The second flange 152 of the first dampening element 128 can be disposed adjacent to the distal end 126 of the outer wall 118 of the seal body 114. In an embodiment, the second flange 152 can be disposed immediately adjacent to the distal end 126, e.g., in direct contact therewith. As illustrated, a radially outer edge 164 of the second flange 152 can terminate along a plane defined by an outer surface 166 of the outer wall 118 of the seal body 114.

Referring again to FIG. 2, in an embodiment, at least one of the first and second dampening elements 128 and 130 can include a split ring configuration. That is, the at least one of the first and second dampening elements 128 and 130 can define a gap 168 in the circumferential direction. By way of example, the gap 168 can occupy at least 0.01% of the circumference of the nested dampener system 124, such as at least 0.05% of the circumference of the nested dampener system 124, such as at least 0.1% of the circumference of the nested dampener system 124, such as at least 0.2% of the circumference of the nested dampener system 124, such as at least 0.3% of the circumference of the nested dampener system 124, such as at least 0.4% of the circumference of the nested dampener system 124, such as at least 0.5% of the circumference of the nested dampener system 124, such as at least 0.75% of the circumference of the nested dampener system 124, such as at least 1% of the circumference of the nested dampener system 124, such as at least 5% of the circumference of the nested dampener system 124. The gap 168 can permit enhanced flexure of the at least one of the first and second dampening elements 128 and 130 as compared to non-split arrangements. In a particular embodiment, both of the first and second dampening elements 128 and 130 can define gaps 168. The gaps 168 and 168 of the first and second dampening elements 128 and 130 may be circumferentially aligned with one another. Alternatively, the gaps 168 and 168 of the first and second dampening elements 128 and 130 may be angularly offset from one another. For example, the gaps 168 and 168 can be angularly offset from one another by at least 1°, such as at least 2°, such as at least 3°, such as at least 4°, such as at least 5°, such as at least 10°, such as at least 15°, such as at least 20°, such as at least 25°, such as at least 30°, such as at least 45°.

In certain embodiments, the first and second dampener elements 128 and 130 can include the same, or generally same, materials as compared to one another. By way of example, the first and second dampener elements 128 and 130 can include steel alloys (e.g., 17-7 PH, spring steel, piano wire, etc.) and nickel alloys (IN718, IN625, X-750, etc.). In other embodiments, the first and second dampener elements 128 and 130 can include different, or generally different, compositions, e.g., materials, as compared to one another.

As previously described, the nested dampener structure 124 may be configured to dampen vibrational frequencies travelling through the seal 108. In certain instances, the first and second dampening elements 128 and 130 can be configured to dampen, or dissipate, different vibrational frequencies as compared to one another. This may include overlapping frequencies. For example, the first dampening element 128 can be configured to dissipate vibrational energy associated with a first range of frequencies while the second dampening element 130 can be configured to dissipate vibrational energy associated with a second range of frequencies. The first and second range of frequencies can be at least partially different from one another. The first and second range of frequencies can also overlap at least partially. For example, the first and second range of frequencies can overlap at least 1%, such as at least 2%, such as at least 3%, such as at least 4%, such as at least 5%, such as at least 6%, such as at least 7%, such as at least 8%, such as at least 9%, such as at least 10%, such as at least 15%, such as at least 20%, such as at least 25%, such as at least 50%. The remaining vibrational frequencies of the first and second ranges can accordingly each exhibit independent dissipation over a separate range of frequencies. In such a manner, the first and second dampening elements 128 and 130 can operate in concert to dissipate vibrational energy within the seal 108, thereby elongated the operational lifespan of the seal 108.

Figure 5:
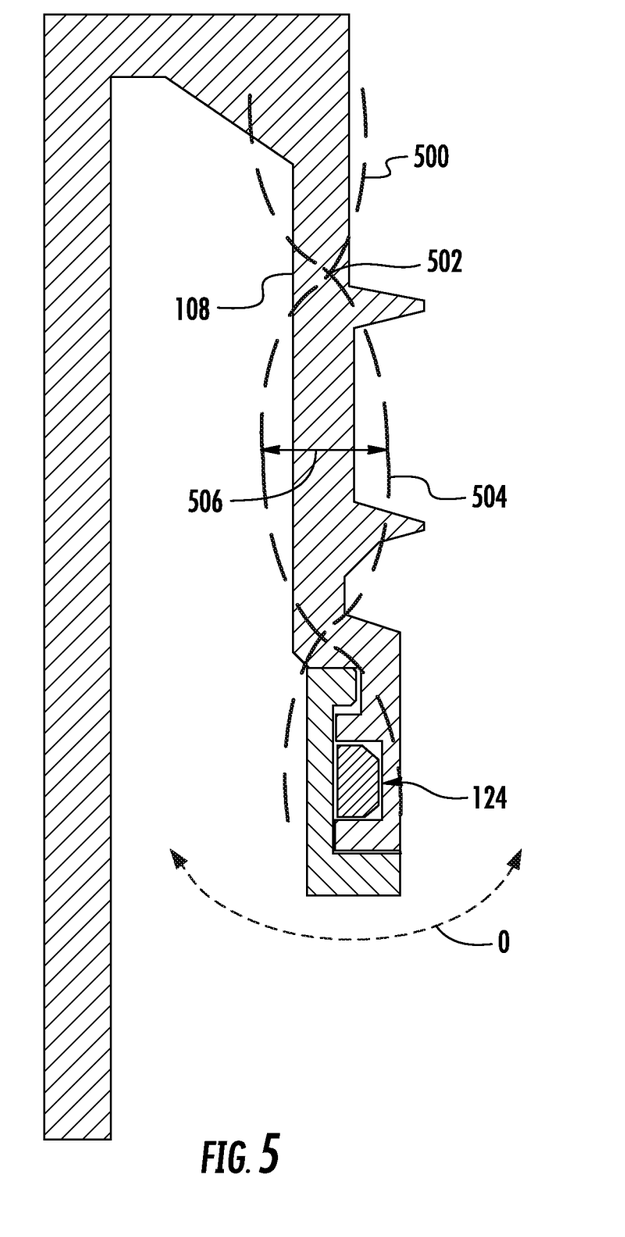
FIG. 5 is a schematic view of a seal and vibrational frequencies encountered during operation in accordance with an exemplary embodiment of the present disclosure.

Vibrational frequencies in seals described herein can manifest in a variety of ways. In the exemplary embodiment illustrated in FIG. 5, vibrational waves 500 propagating in the seal 108 include resonant frequencies resulting in harmonic oscillations with nodal points of convergence 502 (harmonics) spaced apart by areas of displacement 504. The nested dampener structure 124 can reduce the amplitude 506 of the areas of displacement 504, resulting in reduced transmission of vibrational forces along the seal 108 and system described herein. In an embodiment, the nested dampener structure 124 can be disposed at an area of the vibrational waves 500 corresponding with an area of displacement 504. That is, the nested dampener structure 124 can be disposed along the seal 108 at a location spaced apart from the nodal point(s) of convergence 502. In an embodiment, the nested dampener structure 124 is disposed at an area of peak amplitude 506. For example, the nested dampener structure 124 can be disposed equidistant between adjacent nodal points of convergence 502. As such location, in accordance with certain embodiments described herein, the nested dampener structure 124 can have maximum vibrational dampening effectiveness, reducing oscillation as shown by dashed line O.

Further aspects of the invention are provided by the subject matter of the following clauses:

Embodiment 1

A labyrinth seal comprising: an annular seal body; a nested dampener system disposed along the annular seal body, the nested dampener system comprising: a first dampening element; and a second dampening element, wherein opposite axial ends of the nested dampener system are defined by the first dampening element, and wherein the second dampening element is disposed outside of at least a portion of the first dampening element in a radial direction.

Embodiment 2

The labyrinth seal of any one or more of the embodiments, wherein the second dampening element has an axial length less than an axial length of the first dampening element.

Embodiment 3

The labyrinth seal of any one or more of the embodiments, wherein the first dampening element defines a generally C-shaped body, and wherein the second dampening element is disposed at least partially within an inner volume defined by the generally C-shaped body.

Embodiment 4

The labyrinth seal of any one or more of the embodiments, wherein the first and second dampening elements are spaced apart from one another in a radial direction by a gap.

Embodiment 5

The labyrinth seal of any one or more of the embodiments, wherein the annular seal body defines an inner wall and an outer wall spaced apart from one another by an annulus, wherein the outer wall of the annular seal body defines an inner diameter, and wherein an innermost portion of the nested dampener system is disposed outside of the inner diameter of the outer wall in a radial direction.

Embodiment 6

The labyrinth seal of any one or more of the embodiments, wherein the outer wall of the annular seal further defines an outer diameter, and wherein an outermost portion of the nested dampener system is disposed inside of the outer diameter of the outer wall in a radial direction.

Embodiment 7

The labyrinth seal of any one or more of the embodiments, wherein the first and second dampening elements each comprises a split ring.

Embodiment 8

The labyrinth seal of any one or more of the embodiments, wherein the labyrinth seal is configured to operate at one or more vibrational frequencies, and wherein the nested dampener system is disposed at an axial location spaced apart from a nodal point of convergence of vibration of the one or more vibrational frequencies.

Embodiment 9

The labyrinth seal of any one or more of the embodiments, wherein the first dampening element is configured to dissipate vibrational energy of the labyrinth seal associated with a first range of frequencies, wherein the second dampening element is configured to dissipate vibrational energy of the labyrinth seal associated with a second range of frequencies, and wherein the first and second range of frequencies are at least partially different from one another.

Embodiment 10

A gas turbine engine comprising: a stator; a rotor rotatable relative to the stator; a labyrinth seal disposed in an annular gap defined between the stator and the rotor, the labyrinth seal comprising: an annular seal body; a nested dampener system disposed along the annular seal body, the nested dampener system comprising: a first dampening element; and a second dampening element, wherein opposite axial ends of the nested dampener system are defined by the first dampening element, and wherein the second dampening element is disposed outside of the first dampening element in a radial direction.

Embodiment 11

The gas turbine engine of any one or more of the embodiments, wherein the first and second dampening elements are spaced apart from one another in a radial direction by a gap.

Embodiment 12

The gas turbine engine of any one or more of the embodiments, wherein the first dampening element defines a generally C-shaped body, and wherein the second dampening element is disposed at least partially within an inner volume defined by the generally C-shaped body.

Embodiment 13

The gas turbine engine of any one or more of the embodiments, wherein the annular seal body defines an inner wall and an outer wall spaced apart from one another by an annulus, wherein the outer wall of the annular seal body defines an inner diameter and an outer diameter, wherein an innermost portion of the nested dampener system is disposed outside of the inner diameter of the outer wall in a radial direction, and wherein an outermost portion of the nested dampener system is disposed inside of the outer diameter of the outer wall in a radial direction.

Embodiment 14

The gas turbine engine of any one or more of the embodiments, wherein the annular seal body defines an inner wall and an outer wall spaced apart from one another by an annulus, wherein the outer wall defines a distal end in an axial direction, and wherein the nested dampener system defines the distal end of the outer wall.

Embodiment 15

The gas turbine engine of any one or more of the embodiments, wherein the first dampening element defines the distal end of the outer wall, the first dampening element comprising a generally C-shaped body defining an inner volume in which the first dampening element is at least partially disposed within.

Embodiment 16

The gas turbine engine of any one or more of the embodiments, wherein the annular seal comprises an engine alloy.

Embodiment 17

The gas turbine engine of any one or more of the embodiments, wherein the first dampening element defines a generally C-shaped body, and wherein the second dampening element is disposed at least partially within an inner volume defined by the generally C-shaped body.

Embodiment 18

A system comprising: a stator; a rotor rotatable relative to the stator; a labyrinth seal disposed in an annular gap defined between the stator and the rotor, the labyrinth seal comprising: an annular seal body having an inner wall and an outer wall spaced apart from one another by an annulus; a nested dampener system disposed along the outer wall, the nested dampener system comprising: a first dampening element defining a generally C-shaped body, wherein the first dampening element defines a distal end of the outer wall of the annular seal; and a second dampening element disposed at least partially within an inner volume defined by the generally C-shaped body, wherein opposite axial ends of the nested dampener system are defined by the first dampening element, wherein the second dampening element is disposed outside of the first dampening element in a radial direction, and wherein the first and second dampening elements are spaced apart from one another in the radial direction by a gap.

Embodiment 19

The system of any one or more of the embodiments, wherein the outer wall of the annular seal body defines an inner diameter and an outer diameter, wherein an innermost portion of the nested dampener system is disposed outside of the inner diameter of the outer wall in a radial direction, and wherein an outermost portion of the nested dampener system is disposed inside of the outer diameter of the outer wall in a radial direction.

Embodiment 20

The system of any one or more of the embodiments, wherein at least one of the first and second dampening elements comprises a split ring.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:
1. A labyrinth seal comprising:
an annular seal body;
a nested dampener system disposed along the annular seal body, the nested dampener system comprising:
a first dampening element; and
a second dampening element,
wherein opposite axial ends of the nested dampener system are defined by the first dampening element, and
wherein the second dampening element is disposed outside of at least a portion of the first dampening element in a radial direction,
wherein the annular seal body defines an inner wall and an outer wall spaced apart from one another by an annulus, wherein the outer wall of the annular seal body defines an inner diameter, and wherein an innermost portion of the nested dampener system is disposed outside of the inner diameter of the outer wall in the radial direction, and
wherein the second dampening element has an axial length less than an axial length of the first dampening element.

2. The labyrinth seal of claim 1, wherein the labyrinth seal is for a gas turbine engine, wherein the gas turbine engine comprises:
a stator; and
a rotor that is rotatable relative to the stator, wherein the labyrinth seal is disposed in an annular gap that is defined between the stator and the rotor.

3. The labyrinth seal of claim 1, wherein the first dampening element defines a C-shaped body, and wherein the second dampening element is disposed at least partially within an inner volume defined by the C-shaped body of the first dampening element.

4. The labyrinth seal of claim 1, wherein the first and second dampening elements are spaced apart from one another in the radial direction by a gap.

5. The labyrinth seal of claim 1, wherein the outer wall of the annular seal body further defines an outer diameter, and wherein an outermost portion of the nested dampener system is disposed inside of the outer diameter of the outer wall in the radial direction.

6. The labyrinth seal of claim 1, wherein the first and second dampening elements each comprises a split ring.

7. The labyrinth seal of claim 1, wherein the labyrinth seal is configured to operate at one or more vibrational frequencies, and wherein the nested dampener system is disposed at an axial location spaced apart from a nodal point of convergence of vibration of the one or more vibrational frequencies.

8. The labyrinth seal of claim 1, wherein the first dampening element is configured to dissipate vibrational energy of the labyrinth seal associated with a first range of frequencies, wherein the second dampening element is configured to dissipate vibrational energy of the labyrinth seal associated with a second range of frequencies, and wherein the first and second range of frequencies are at least partially different from one another.

9. A labyrinth seal comprising:
an annular seal body;
a nested dampener system disposed along the annular seal body, the nested dampener system comprising:
a first dampening element; and
a second dampening element,
wherein opposite axial ends of the nested dampener system are defined by the first dampening element, and wherein the second dampening element is disposed outside of at least a portion of the first dampening element in a radial direction,
wherein the annular seal body defines an inner wall and an outer wall spaced apart from one another by an annulus, wherein the outer wall of the annular seal body defines an inner diameter, and wherein an innermost portion of the nested dampener system is disposed outside of the inner diameter of the outer wall in the radial direction, and
wherein the first dampening element defines a C-shaped body, and wherein the second dampening element is disposed at least partially within an inner volume defined by the C-shaped body of the first dampening element.

10. The labyrinth seal of claim 9, wherein the first and second dampening elements are spaced apart from one another in the radial direction by a gap.

11. The labyrinth seal of claim 9, wherein the labyrinth seal is for a gas turbine engine, wherein the gas turbine engine comprises:
a stator; and
a rotor that is rotatable relative to the stator, wherein the labyrinth seal is disposed in an annular gap that is defined between the stator and the rotor.

12. The labyrinth seal of claim 9, wherein the outer wall of the annular seal body further defines an outer diameter, and wherein an outermost portion of the nested dampener system is disposed inside of the outer diameter of the outer wall in the radial direction.

13. The labyrinth seal of claim 9, wherein the first and second dampening elements each comprises a split ring.

14. The labyrinth seal of claim 9, wherein the labyrinth seal is configured to operate at one or more vibrational frequencies, and wherein the nested dampener system is disposed at an axial location spaced apart from a nodal point of convergence of vibration of the one or more vibrational frequencies.

15. The labyrinth seal of claim 9, wherein the first dampening element is configured to dissipate vibrational energy of the labyrinth seal associated with a first range of frequencies, wherein the second dampening element is configured to dissipate vibrational energy of the labyrinth seal associated with a second range of frequencies, and wherein the first and second range of frequencies are at least partially different from one another.

16. A labyrinth seal comprising:
an annular seal body;
a nested dampener system disposed along the annular seal body, the nested dampener system comprising:
a first dampening element; and
a second dampening element,
wherein opposite axial ends of the nested dampener system are defined by the first dampening element, and wherein the second dampening element is disposed outside of at least a portion of the first dampening element in a radial direction,
wherein the annular seal body defines an inner wall and an outer wall spaced apart from one another by an annulus, wherein the outer wall of the annular seal body defines an inner diameter, and wherein an innermost portion of the nested dampener system is disposed outside of the inner diameter of the outer wall in the radial direction, and
wherein the first and second dampening elements are spaced apart from one another in the radial direction by a gap.

17. The labyrinth seal of claim 16, wherein the labyrinth seal is for a gas turbine engine, wherein the gas turbine engine comprises:
a stator; and
a rotor that is rotatable relative to the stator, wherein the labyrinth seal is disposed in an annular gap that is defined between the stator and the rotor.

18. The labyrinth seal of claim 16, wherein the outer wall of the annular seal body further defines an outer diameter, and wherein an outermost portion of the nested dampener system is disposed inside of the outer diameter of the outer wall in the radial direction.

19. The labyrinth seal of claim 16, wherein the labyrinth seal is configured to operate at one or more vibrational frequencies, and wherein the nested dampener system is disposed at an axial location spaced apart from a nodal point of convergence of vibration of the one or more vibrational frequencies.

20. The labyrinth seal of claim 16, wherein the first dampening element is configured to dissipate vibrational energy of the labyrinth seal associated with a first range of frequencies, wherein the second dampening element is configured to dissipate vibrational energy of the labyrinth seal associated with a second range of frequencies, and wherein the first and second range of frequencies are at least partially different from one another.

* * * * *